United States Patent [19]

Bak et al.

[11] 3,929,722

[45] Dec. 30, 1975

[54] SELF EXTINGUISHING HIGH IMPACT RESISTANT POLYMERIC POLYBLEND

[75] Inventors: Bruce S. Bak, Longmeadow; Gary L. Deets, Springfield; Francis J. Pokigo, Longmeadow, all of Mass.

[73] Assignee: Monsanto Company, St. Louis, Mo.

[22] Filed: Mar. 8, 1972

[21] Appl. No.: 232,913

[52] U.S. Cl...... 260/42.47; 106/15 FP; 260/45.7 R; 260/45.75 R; 260/876 R; 260/879; 260/884; 260/DIG. 24

[51] Int. Cl.². .... C08K 3/18; C08L 9/02; C08L 9/06

[58] Field of Search . 260/47.75 R, 2.5 FP, DIG. 24, 260/876 R, 884, 45.7 R, 42.47, 879; 106/15 FP

[56] References Cited
UNITED STATES PATENTS

| | | | |
|---|---|---|---|
| 3,073,798 | 1/1963 | Baer | 260/876 R |
| 3,100,198 | 8/1963 | Fournet et al. | 260/876 R |
| 3,660,346 | 5/1972 | Gray et al. | 106/15 FP |

OTHER PUBLICATIONS

Condensed Chem. Dictionary, (5th ed.), (Reinhold), (N.Y.), (1956), p. 1087.

Encyclopedia of Polymer Science and Technology, (Vol. 7), (Interscience), (N.Y.), (1967), pp. 14, 17–19 and 612–615.

*Primary Examiner*—Donald E. Czaja
*Assistant Examiner*—H. H. Fletcher

[57] ABSTRACT

This invention relates to a self-extinguishing high impact resistant polyblend composition comprising a styrene polymer polyblended with a crosslinked polychloroprene rubber, a grafted crosslinked polybutadiene rubber and a metal compound.

16 Claims, No Drawings

SELF EXTINGUISHING HIGH IMPACT RESISTANT POLYMERIC POLYBLEND

BACKGROUND OF THE INVENTION

Polymeric materials of the styrene family including polystyrene and its copolymers, impact resistant polystyrene containing dispersed rubber phases as polyblends and more recently impact resistant copolymers and terpolymers of styrene have gained great commercial utility as tough engineering plastics. Such plastics appear as structural parts of appliances, automobiles and housing.

Government codes are requiring that such plastics be flame-retarding and self-extinguishing. The industry has developed many improved grades of such materials, however, with the ever greater need for high performance plastics, most self-extinguishing types have suffered from inadequate physical properties such as toughness and impact strength.

Self-extinguishing plastics have been formulated with various additives which when added in sufficient amount to produce self-extinguishing properties in the polymer cause the physical properties to be seriously impaired.

Flame-proofing materials such as the halogenated aliphatic and aromatic compounds which are compatible with the styrene polymer family of plastics often act as plasticizers and lower the modulus, reducing the tensile strength. Such materials are thought to decompose and provide a halogen gas-phase that inhibits the gas-phase combustion of the plastic or perhaps the initial pyrolysis mechanism.

Certain inorganic compounds, in particular, metal oxide compounds when used in combination with the halogenated organic compound, appear to catalyze their decomposition or enter the chain of reactions to form metal halides that are effective flame retardants. Such systems are not predictable in that many such combinations lower the melt point of the polymer causing it to pyrolyze more readily, hence, actually increasing flammability. Beyond flammability such combinations have caused the polymer systems to degrade during heat processing or on exposure to light.

Polymeric plasticizers containing halogens such as polyvinyl chloride and chlorinated olefins have been tried to overcome the deficiencies of the lower molecular weight halogenated organic compounds. Such polymeric materials, however, as used in the styrene family of plastics have lowered their heat stability during processing and given lower physical properties particularly lower modulus, heat distortion and impact strength.

The above problems have been overcome in the styrene family of impact polymeric polyblends by the present invention of incorporating a particular crosslinked chloroprene rubber that will provide self-extinguishing properties and in combination with a grafted diene-rubber, superior impact strength. It has been further discovered that the crosslinked chloroprene rubber when used in combination with certain metal oxides in the polyblends gives even further improvement in self-extinguishing properties.

SUMMARY OF THE INVENTION

The present invention relates to a self-extinguishing polyblend composition and more particularly to a composition of matter comprising:

A self-extinguishing high impact strength polymeric polyblend composition comprising:
A. a polymer of at least one monovinylidene aromatic monomer and an ethylenically unsaturated nitrile monomer wherein said ethylenically unsaturated nitrile monomer moiety constitutes from 0 to about 90% by weight of said polymer uniformly blended with,
B. A crosslinked chloroprene rubber, said rubber being present in the polyblend in from about 15–40% by weight,
C. A diene rubber, said diene rubber being present in the polyblend in from about 0.5–8.0% by weight, said rubber being grafted with:
 1. at least one monovinylidene aromatic monomer and
 2. an ethylenically unsaturated nitrile monomer wherein said ethylenically unsaturated nitrile monomer moiety constitutes from 0% to about 90% by weight of the total monomers grafted and
D. An inorganic compound selected from the group consisting of $Sb_2O_3$, $Bi_2O_3$, $MoO_3$, $SnO_2$, $WO_3$, and mixtures of the same.

DESCRIPTION OF THE PREFERRED EMBODIMENTS

As employed herein, the term polyblend means a mechanical mixture of incompatible polymers wherein the mixing is carried out in the melt phase with the smaller volume polymer phase being dispersed uniformly in the larger volume polymer phase in the melt and cooled state.

In the present invention the crosslinked chloroprene rubber phase and the grafted diene rubber phase are dispersed or polyblended into the larger polystyrene or polystyrene copolymer phase by the conventional melt working of a mechanical mixture of the two. The metal oxides are also incorporated in this same mixture and dispersed in the larger volume polymer phase by melt working. Melt working and mixing is conventionally carried out, by those skilled in the art, through extrusion, milling or banburying for example wherein the styrene polymer phase reaches a melt temperature of 400° to 500°F. Other additives may be present in the melt, e.g. anti-oxidants, lubricants and pigments.

Such polystyrene polyblends have the rigidity and modulus of the larger outer polystyrene or polystyrene copolymer phase. The inner grafted diene rubber phase and the cross-linked chloroprene rubber phase exist as small rubber particles that provide the polyblend with much higher impact strength than the rigid outer polymeric phase can provide as a single phase. Such rubber particles are considered to be stress relieving centers that give the polyblend high impact strength, greater elongation at fail under stress and greater toughness without serious loss of modulus or rigidity in the outer phase.

The grafted diene rubber is a product of polymerization wherein at least one monovinylidene aromatic monomer and/or ethylenically unsaturated nitrile monomers are polymerized in the presence of diene rubber. The polymerization reaction causes the monomers to polymerize as polymer and as copolymer chains attached to the rubber molecule forming a grafted diene rubber.

The monovinylidene aromatic monomers used in the polymers making up the polyblends of this invention include styrene, aralkylstyrenes, e.g. o-, m-, and p- methylstyrenes, -ethylstyrenes, -isopropylstyrenes, -butylstyrenes, -tertiary butylstyrenes, various alphalkylstyrenes, e.g. methylstyrenes, ethylstyrenes, various arhalostyrenes, e.g., O-, m-, and p-chlorostyrenes, bromostyrenes, fluostyrenes; various di, tri, tetra and penta substituted chlorostyrenes, bromostyrenes and fluorstyrenes and various alpha-and beta-halosubstituted styrenes, e.g. alphahlorostyrenes, alphabromostyrenes, betachlorostyrenes, betabromostyrenes and alpha, beta halosubstituted and the like.

The ethylenically unsaturated nitrile monomers used in the polymers of this invention are e.g., acrylonitrile, methacrylonitrile, ethacrylonitrile, methyl methacrylonitrile and the like with acrylonitrile and methacrylonitrile and the like being preferred.

Either of the vinylidene aromatic monomer or the ethylenically unsaturated nitrile monomer can be used in major proportions relative to one another in copolymerization or grafting. For example, styrene and acrylonitrile will copolymerize with the preferred ratio of styrene to acrylonitrile (S/AN) being about 75% S to 25% AN or the azeo-tropic mixture of the two which gives a uniform copolymer. These ratios can be varied from 95/1 to 1/95, S/AN, with known polymerization methods to give polymers that have great utility.

In applications that need properties such as gas impermeability, light stability, toughness, etc., it is preferred to have the nitrile monomer present in greater proportions, e.g. up to 90 weight percent. For other applications where the fabricated part needs greater plasticity, composition containing a major portion of the monovinylidene aromatic monomer is preferred, e.g., up to 90 weight percent. The monovinyl aromatic monomer may be halogensubstituted providing a halogen source for flame retarding and can be used in major proportions in the present invention, e.g., 20 to 80 weight percent.

The diene rubber component of the polyblend may be polybutadiene or copolymers of butadiene and other monomers, e.g., acrylonitrile, methacrylonitrile, styrene, arhalostyrene, alphahalostyrenes, aralkylstyrenes, alphalkylstyrenes, vinyl chloride; or mixtures of polybutadiene and other synthetic or natural rubbers, e.g., butadiene-styrene copolymer, isoprene, nitrile rubbers, acrylate rubber and butadiene-styrene-acrylonitrile terpolymers.

The preferred diene rubbers of this invention are those commercially available higher cis-polybutadiene rubbers having a cis-isomer content of about 30% to 98% and having a second order transition temperature, Tg, of from about −50°C. to −105°C. as determined by ASTM test D-746-52T. These rubbers are available for example as Diene 35 and 55 from the Firestone Rubber Company of Akron, Ohio and as Polysar Taktene 1202 from the Polymer Corporation of Sarnia, Ontario. Other soluble diene rubbers include copolymers of conjugated 1,3 butadiene with up to equal amounts by weight of one or more copolymerizable monoethylenically unsaturated monomers such as monovinylidene aromatic monomers, e.g. styrene, and monoethylenically unsaturated nitriles, e.g., acrylonitrile. The preferred diene copolymer rubbers are those having a second order transition temperature, Tg, range of from about −20°C. to −70°C.

The polychloroprene rubbers contained in an emulsion and used in the preparing the polyblends of the present invention are readily available in the form of latices. These latices are commercially available as Neoprene Latices from the E. I. DuPont DeNemours and Company, Wilmington, Delaware and are described in the reference "Neoprene Latex" by J. C. Carl published by DuPont in 1962. These latices have a rubber solids content of about 34.5% to 60%, a pH of about 9 to 13, latex specific gravity of about 1.10 to 1.15, rubber specific gravity of 1.23 to 1.42, latex viscosity of 16 to 400 cps. (Brookfield viscosity) and the latices are stabilized by anionic or cationic emulsifiers. The rubbers contained in the latices are crosslinked and are a medium to high gel types, are viscous, having a Mooney viscosity of at least about 200 (MS-2-½ min. 212°F). The rubber particle size distribution of such latices can be varied so as to give the selected weight average particle size range desired and disclosed in this invention.

The general purpose latices that are commercially available as neoprene latices and described above have a particle diameter range of about 0.05 to 0.19 microns with a weight average particle size of about 0.12 microns.

Such neoprene latices are also commercially available from the Petro-Tex Chemical Corporation of Houston, Texas, e.g., neoprene latex L200 and from DuPont, e.g., neoprene latex 842A. The polychloroprene rubbers can be a crosslinked solid rubber, e.g., a commercial neoprene rubber such as Neoprene WB available from the DuPont Company. Neoprene WB has a molecular weight ranging from 180,000 to 200,000 and a chlorine content of 40%.

It has been discovered that high impact, self-extinguishing polyblends using crosslinked chloroprene rubbers can have their physical properties further enhanced by blending in small amounts of grafted polybutadiene rubbers to increase impact strength particularly low temperature impact properties. Chloroprene rubbers have a second order transition temperature (Tg by ASTM Test D-746-52T) of about −40°C. and become brittle as this temperature is approached in use. The polyblends lose impact strength as the polyblend reaches this temperature because the grafted rubber particles of the polyblend become brittle can no longer absorb stress. Polybutadiene rubbers have a lower Tg, in particular, the high cis-type polybutadiene rubbers have a Tg range of from about −50° to −105°C. with a preferred range of from about −75° to −95°C. Such rubbers are grafted with monovinylidene aromatic monomers (e.g. styrene) and or ethylenically unsaturated nitrile monomers, e.g., acrylonitrile or methacrylonitrile and are functional and compatible with the polyblends of this invention.

It has been discovered that a small amount of grafted crosslinking polybutadiene rubber wherein the rubber is grafted with 50 to 150% by weight of said monomers and provides 0.5% to 5% preferably 1 to 3% by weight of rubber to the total polyblend giving an impact strength of 1.5 to 7.0 ft. lbs. when blended with the crosslinked polychloroprene having a rubber with a small particle size. The grafted polybutadiene rubber particle has a preferred weight average size of from about 0.7 to 2.5 microns and most preferred 0.8 to 1.5 microns.

It is further critical to the present invention to have present in the polyblend at least about 1% by weight of the polyblend of an inorganic compound with the preferred range of about 1% to 15% and the most preferred amount being about 5% to 10%.

The inorganic compounds preferred are certain metal oxides, e.g. $Sb_2O_3$, $Bi_2O_3$, $MoO_3$, $SnO_2$, $WO_3$, and the like. The most preferred being $Sb_2O_3$.

The following examples are presented in illustration of the present invention and are not intended in any way to limit the scope or spirit thereof.

TEST PROCEDURES

Underwriter's Laboratory Subject No. 94 Test

Self-extinguishing (S.E.) properties were measured using the above test which is carried out on test specimen 6 inch × ½ × ⅛ inch as follows:

The test specimen is supported from the upper end, with longest dimension vertical, by a clamp on a ring stand so that the lower end of the specimen is ⅜ inch above the top of the burner tube. The burner is then placed remote from the sample, ignited, and adjusted to produce a blue flame ¾ inch in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen noted.

If the specimen drips flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of three specimens (6 flame applications) shall not exceed 25 seconds (maximum not more than 30 seconds) and the portion of the specimen outside the clamp shall not be completely burned in the test.

Materials which comply with the above requirements and do not drip any flaming particles or droplets during the burning test will classify as "self-extinguishing, Class I".

Materials which comply with the above requirements, but drip flaming particles or droplets which burn only briefly during the test will classify as "self-extinguishing Class II".

Class SE-O is given to materials wherein the duration of flaming or glowing combustion averages less than 5 seconds under the conditions above.

Flammability of Plastics Using the Oxygen Index Method

ASTM Test D-2863 is used with the General Electric Flammability Index Tester Model A-4990-A. A sample bar ⅛ × ½ × 5 inch is molded and placed in the above tester. The tester is attached to an oxygen tank and a nitrogen tank. By means of control valves, an atmosphere can be created inside the tester containing any desired ratio of nitrogen to oxygen. The lower the oxygen concentration which will support combustion, the higher the degree of flammability of the test specimen. It is generally considered that the oxygen content should be at least 20% for combustion support in order for a material to be considered sufficiently flame resistant. Of course, the higher the value, the better. A propane torch flame is applied to one end of the test specimen in the tester. If the specimen burns for at least three minutes, the concentration of oxygen is reduced. By a system of trial and error with several specimens the limiting oxygen concentration is determined where burning will just be supported for at least three minutes, but will not be supported at an oxygen concentration 1% lower. This limiting concentration is then reported as the Limiting Oxygen Index (LOI).

Weight Average Particle Size Test

The weight average particle size is determined by dispersing the polyblend in dimethylformamide using 2 grams of polyblend in 98 grams of solvent. The dispersion is then diluted 3 to 1 with methyl-ethyl-ketone and analyzed according to the published procedure of Groves, M. J., Kay, B. H., Scarlett, B., "Size Analysis of Subsieve Powders Using a Centrifugal Photosedimentometer," British Chemical Engineering, Vol. 9:742–744(1964). A Model 3000 Particle Size Analyzer available from Martin Sweets Company, 3131 West Market Street, Louisville, Kentucky was used.

Impact Strength Test

ASTM Test D-256 – Method A commonly known as the Izod Test. Impact values are a measure of toughness and high values are needed for engineering applications preferably greater than 1.5 ft. lbs./in.

Heat Distortion Temperature Under Load

ASTM Test D-648 was used with a load of 264 psi. Test values here should remain high so that the polyblend is functional at high temperatures in engineering applications, e.g. automotive and appliances.

Graft Level Test

Weigh out 1 gram of grafted resin and disperse in 20 ml of a solvent of 50/50 dimethylformamide/methyl ethyl ketone. The matrix polymer will dissolve. Centrifuge and decant off the solvent. Repeat the process three times and dry the grafted rubber under vacuum and weigh.

$$\% \text{ Graft} = \frac{\text{wgt. of grafted rubber} - \text{wgt. of rubber} \times 100}{\text{wgt. of rubber}}$$

Sample Preparation

The plastic to be tested is usually in comminuted form. A portion of the plastic particles are compression molded at 330°–360°F. at 7200 psi to form a sheet about ⅛ thick. Sample bars are then cut from the molded sheet having dimensions of ⅛ × ½ × 6 inch.

Embodiments

Samples of polyblend polymers are prepared using uncrosslinked and crosslinked chloroprene rubber to demonstrate the properties of the two types and their ability to provide self-extinguishing properties and impact strength to the styrene family of polymers. Other pertinent physical properties are measured such as the heat distortion under load.

EXAMPLE 1

CONTROL

A typical commercial polyblend of polystyrene and grafted butadiene rubber known as high impact polystyrene or HIPS and available from the Monsanto Company of St. Louis, Missouri as Lustrex HT-91 was molded into test specimens as shown above and tested self extinguishing properties according to the Oxygen Index Method. An Oxygen Index of 17.5% was obtained. The test was repeated using a typical commercial ABS polyblend of a polybutadiene rubber grafted with a mixture of styrene and acrylonitrile monomer blended with a copolymer of styrene and acrylontrile. The ABS polyblend is commercially available from the Monsanto Company of St. Louis, Missouri as Lustran I 740. An Oxygen Index of 18.0% was obtained. Those skilled in the art recognize that plastic materials having an Oxygen Index less than 20% are not considered self-extinguishing. The ABS and HIPS polyblends were also tested with the UL 94 test and failed not being self-extinguishing.

EXAMPLE 2

CONTROL

A polyblend of SAN copolymer (Monsanto Company LNA 21) is prepared using 65 parts SAN polymer, 30 parts of solid soluble non-crosslinked chloroprene rubber (DuPont Neoprene W) available from the DuPont Company of Wilmington, Delaware, and 5 parts of $Sb_2O_3$. The polyblend is colloided on a Bolling roll mill using 130 psi steam pressure to reach a melt temperature of 400°–500°F. for 5 minutes after which the polyblend is stripped from the mill, cooled and comminuted. Test samples were prepared. The UL 94 test gives values of SE-0 showing the polyblend is self-extinguishing. The impact strength test gives an Izod of less than 0.5 ft.lbs./in. demonstrating that chloroprene rubber that is a noncrosslinked rubber lacks the necessary toughness to produce a tough polyblend.

EXAMPLE 3

A polyblend is prepared by first blending an emulsion of a SAN copolymer with an emulsion of crosslinked chloroprene rubber (DuPont Latex 842-A sold by E. I. DuPont Company of Wilmington, Delaware) and coagulating with aluminum sulfate to form a crumb having 40% rubber and 60% SAN. The emulsion SAN copolymer is prepared using the following formulation based on parts per 100 parts of total monomers:

| | |
|---|---|
| Styrene | 70 |
| Acrylonitrile | 30 |
| Water | 116 |
| Potassium Persulfate | 0.005 |
| Terpinoline | 0.003 |
| Rubber Reserve Soap (Emery Industries of Cincinnati, Ohio. Sodium salt of oleic, stearic and palmitic acids) | 0.018 |
| Darvan No. 1 (Sodium salt of a formaldehyde naphthalene sulfonate sold by Dewey and Almy of Cambridge, Mass.) | 0.005 |

The monomers are dispersed in water containing the soap and Darvan and polymerized at 95°C. under reflux for 3 hours and 45 minutes in the presence of the potassium persulfate and catalyst and the terpinoline modifier under agitation. The emulsion contains 46.3% of SAN polymer in the emulsion.

The average particle size of the rubber particles in the chloroprene rubber latex and the polyblend is observed to be about 0.12 microns (weight average based on centrifugal photo sedimentation method).

The crumb is mechanically blended with a SAN copolymer (Monsanto LNA 21 sold by Monsanto Company of St. Louis, Missouri) and tested as in Example 2 with the blend having 30 parts chloroprene rubber, 65 parts SAN polymer and 5 parts $Sb_2O_3$. The Izod test values are 1.5 ft.lbs./in. The UL-94 test have SE-0 values. The percentage of oxygen to support combustion is 25.1% (LOI) and the heat distortion under load at 264 psi is 195°F. It is evident that the polyblend is self-extinguishing; has flame retardancy; has a high heat distortion temperature and has a higher degree of toughness because the rubber is crosslinked. The emulsion blending does provide a better polyblend than that of Example 2 having an impact strength of 1.5 ft.lbs./in. versus 0.5 ft.lbs./in. for a blend of solid rubber and copolymer wherein the rubber is not crosslinked.

EXAMPLE 4

Fourteen parts of a soluble butadiene rubber were dissolved in 26.0 parts of acrylonitrile and 60.0 parts styrene. There were added thereto 0.07 part of a mixture of terbutyl peracetate 0.05 part di-tert-butyl peroxide and stabilizers. The mixture was heated to 100° centigrade with stirring. Terpinolene was added as a chain transfer agent over a period of approximately 5 hours in an amount of about 0.1 part per hour for approximately 5 hours, at the end of which time an additional 10.4 parts were added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexylacrylate which has a specific viscosity of about 4.0 as determined in a 1.0 percent solution in water at 25° centigrade. The resulting suspension was stirred and heated to polymerize the remaining monomer, cooled, centrifuged, washed and dried to recover the graft copolymer in the form of small spherical beads. The ratio of superstrate to substrate was about 0.9 to 1.0:1.0, and the particle size was about 0.9 micron. Since the rubber graft level is about 100%, the final resin contains about 28% by weight of the total polymer as rubber grafted with styrene and acrylonitrile monomer in about the ratio (S/A) charged with about 72% of the final resin being SAN copolymer with an S/A ratio as charged, the final resin being a polyblend formed during polymerization.

EXAMPLE 5

The polyblend crumb of Example 3 having 40% by weight of crosslinked polychloroprene rubber, 60% by weight of SAN copolymer was polyblended with the ABS polyblend of Example 4, SAN copolymer and $Sb_2O_3$. About 70 grams of the polyblend of Example 4 having 14% diene rubber were polyblended with 750 grams of the polyblend of Example 3, 130 grams of SAN copolymer (Monsanto LNA 21 sold by Monsanto Company of St. Louis, Missouri) and 50 grams of $Sb_2O_3$ by melt colloided as in Example 2. A polyblend has by weight percent about 1% polybutadiene rubber, about 30 percent polychloroprene rubber, about 64% SAN and about 5% $Sb_2O_3$. The polyblend was comminuted and tested with data shown in Table 1.

EXAMPLE 6

Using the procedures of Example 5, about 210 grams of the polyblend of Example 4 was polyblended with 750 grams of the polyblend of Example 3, 40 grams of SAN copolymer (Lustran LNA 21) and 5 grams of $Sb_2O_3$ by melt colloiding as in Example 2. The polyblend has by weight percent about 3% by weight of polybutadiene rubber, 30% polychloroprene, 62% SAN and 50% $Sb_2O_3$. The polyblend was comminuted and tested with data shown in Table 1.

EXAMPLE 7

Repeat Example 5 using 35 grams of the polyblend of Example 4. 750 grams of the polyblend of Example 3, 165 grams of SAN (Lustran LNA 21) and 50 grams of $Sb_2O_3$. The polyblend has by weight percent about 0.5% polybutadiene rubber, 30% polychloroprene, 64.5% SAN copolymers and 5% $Sb_2O_3$. The polyblend was tested with data shown in Table 1.

EXAMPLE 8

Prepare a crumb as in Example 3 using 600 grams of DuPont Latex 842-A and 650 grams of the SAN copolymer latex. The crumb consists of 300 grams of chloroprene rubber and 300 grams of SAN copolymer. Polyblend said crumb with 350 grams of ABS polyblend of Example 4 and 50 grams of $Sb_2O_3$ via melt colloiding. The polyblend has about by weight percent 5% polybutadiene, 30% chloroprene, 60% SAN copolymer and 5% $Sb_2O_3$. The polyblend was tested with data shown in Table 1.

EXAMPLE 9

Prepare a crumb as in Example 3 using 800 grams of chloroprene latex and 1180 grams of SAN latex. The crumb consists of 400 grams of chloroprene rubber and 545 grams of SAN copolymer. Polyblend said crumb with 35 grams of ABS polyblend of Example 4 and 20 grams of $Sb_2O_3$ via melt colloiding. The polyblend contains by weight percent about 40% chloroprene rubber, 0.5% butadiene rubber, 57.5% SAN copolymer and 2% $Sb_2O_3$. The polyblend was tested with data shown in Table 1.

EXAMPLE 10

Prepare a crumb as in Example 3 using 400 grams of chloroprene latex and 1100 grams of SAN latex. The crumb consists of 200 grams chloroprene rubber and 510 grams of SAN copolymer. Polyblend said crumb with 210 grams of ABS polyblend of Example 4 and 80 grams of $Sb_2O_3$. The polyblend contains by weight percent 20% chloroprene rubber, 3% butadiene rubber, 69% SAN copolymer and 8% $Sb_2O_3$. The polyblend was tested with data shown in Table 1.

EXAMPLE 11

Prepare a crumb as in Example 3 using 300 grams of chloroprene latex and 910 grams of SAN latex. The crumb consists of 150 grams of chloroprene rubber and 420 grams of SAN copolymer. Polyblend said crumb with 280 grams of ABS polyblend of Example 4 and 150 grams of $Sb_2O_3$. The polyblend consists of by weight percent, 15% chloroprene rubber, 4% butadiene rubber, 66% SAN copolymer and 15% $Sb_2O_3$. The polyblend was tested with data shown in Table 1.

TABLE 1

| Ex. | Diene* Rubber | Chloro* prene | $Sb_2O_3$* | SAN* | UL 94 | Impact Strength | HDLT* |
| --- | --- | --- | --- | --- | --- | --- | --- |
| 5 | 1.0 | 30 | 5 | 64.0 | SE-0 | 2.0 | 193 |
| 6 | 3.0 | 30 | 5 | 62.0 | SE-0 | 3.0 | 190 |
| 7 | 0.5 | 30 | 5 | 64.5 | SE-0 | 1.8 | 195 |
| 8 | 5.0 | 30 | 5 | 60.0 | SE-0 | 4.5 | 180 |
| 9 | 0.5 | 40 | 2 | 57.5 | SE-0 | 2.5 | 185 |
| 10 | 3.0 | 20 | 8 | 69.0 | SE-0 | 2.0 | 190 |
| 11 | 4.0 | 15 | 15 | 66.0 | SE-0 | 2.0 | 195 |

*weight percent
*degrees F ± 2

EXAMPLE 12

A polyblend of high impact polystyrene HIPS is prepared. Thirteen parts of a soluble polybutadiene rubber (e.g. Diene-55 from the Firestone Rubber Company, Akron, Ohio) having a high cis-isomer content of about 30% to 93% and a Tg of −50°C to −105°C are dissolved in 87 parts of styrene monomer together with 0.05 part of ditertiary butyl peroxide, 0.3 part of an anti-oxidant, 0.1 part of a commercial $C_{12}$ mercaptan modifier and 2.0 parts of a refined hydrocarbon oil lubricant. After sweeping the reaction atmosphere free of oxygen with nitrogen, the reaction mixture is agitated and heated en masse until 28% of the styrene monomer has been polymerized. There is then charged to the reaction vessel 200 parts of water having dissolved therein 0.25 part of the sodium salt of bis(sulfonaphthyl) methane, (0.15 part of calcium chloride and 0.25 part of an interpolymer of 95.5 mol percent acrylic acid and 4.5 mol percent 2-ethylhexyl acrylate which has a specific viscosity of about 4.0 as determined in a 1% solution in water at 25°C. Thereafter, the reaction mixture is put under nitrogen pressure and agitated and heated for 3 hours at 130°C. and 5 hours at 140°C. The polymer is obtained in the form of homogeneous small spherical beads having a narrow distribution of particle sizes. Said polymer is a polyblend of about 74 parts polystyrene and 13 parts polybutadiene rubber grafted with about 13 parts of styrene.

EXAMPLES 13 – 18

A series of polyblends are prepared polyblending the HIPS polyblend of Example 12 with a crosslinked polychloroprene rubber, a polystyrene polymer and $Sb_2O_3$. The polychloroprene rubber is a crosslinked solid rubber commercially available from the DuPont Company of Wilmington, Delaware as Neoprene WB. The Neoprene WB is a crosslinked polychloroprene rubber having a molecular weight distribution ranging from 180,000 to 200,000 and a chlorine content of about 40%. The polystyrene polymer is a homopolymer of polystyrene commercially available as Lustrex HF77 from the Monsanto Company, St. Louis, Missouri. The polyblend formulations and test data are shown below with the components of the combination shown in percent by weight.

TABLE 2

| Ex. | HIPS[1] | Diene Rubber | Chloroprene | $Sb_2O_3$ | Polystyrene | Oxygen Index | UL 94 | Imp. Str. | HDLT |
|---|---|---|---|---|---|---|---|---|---|
| 13 | 20 | 2.6 | 40 | 7 | 33 | 28.7 | SE-0 | 1.0 | 165 |
| 14 | 30 | 3.9 | 30 | 7 | 33 | 23.7 | SE-1 | 1.75 | 169 |
| 15 | 30 | 3.9 | 30 | 9 | 31 | 24.4 | SE-0 | 1.68 | 168 |
| 16 | 55 | 7.2 | 40 | 5 |    | 26.1 | SE-0 | 2.0 | 160 |
| 17 | 50 | 6.5 | 15 | 15 | 20 | 24.3 | SE-1 | 1.0 | 175 |
| 18 | 30 | 3.9 | 30 | 5 | 35 | 23.7 | Fail | 1.74 | 165 |

[1]HIPS (13% diene rubber)
[2]Lustrex HF77, Monsanto Co.

The polyblends are self-extinguishing and have a high level of impact strength considering the high level of loading of chloroprene rubber and $Sb_2O_3$. The heat distortion temperature is also considered functional for impact grade materials.

Those skilled in the art would recognize that many variations can be made in the product of this invention without departing from the essential spirit and scope thereof.

What is claimed is:

1. A self-extinguishing high impact strength polymeric polyblend composition comprising:
   A. about 37 to 69.5% by weight of a polymer of at least one monovinylidene aromatic monomer and an ethylenically unsaturated nitrile monomer wherein said ethylenically unsaturated nitrile monomer moiety constitutes from 0% to about 90% by weight of the said polymer uniformly blended with,
   B. a crosslinked chloroprene rubber, said rubber being present in the polyblend in from about 15–40% by weight,
   C. a diene rubber, said diene rubber being present in the polyblend in from about 0.5–8.0% by weight, said diene rubber being grafted with:
      1. at least one monovinylidene aromatic monomer, and
      2. an ethylenically unsaturated nitrile monomer wherein said ethylenically unsaturated nitrile monomer moiety constitutes from 0% to about 90% by weight of the total monomers grafted, and
   D. an inorganic compound selected from the group consisting of $Sb_2O_3$, $Bi_2O_3$, $MoO_3$, $SnO_2$, $WO_3$, and mixtures of the same, said compound being present in from about 1–15% by weight of the polyblend, the total weight percentage of the polyblend being 100%.

2. The polyblend of claim 1, wherein said monovinylidene aromatic monomer is selected from the group consisting of styrene, aralkylstyrenes, alphalkylstyrenes, alphahalostyrenes and arhalostyrenes and mixtures of the same.

3. The polyblend of claim 1, wherein the monovinylidene aromatic monomer is styrene.

4. The polyblend of claim 1, wherein the monovinylidene aromatic monomer is monochlorostyrene.

5. The polyblend of claim 1, wherein said ethylenically unsaturated nitrile is selected from the group consisting of acrylonitrile, methacrylonitrile, ethacrylonitrile and mixtures of the same.

6. The polyblend of claim 1, wherein the ethylenically unsaturated nitrile is acrylonitrile.

7. The polyblend of claim 1, wherein the ethylenically unsaturated nitrile is methacrylonitrile.

8. The polyblend of claim 1, wherein said inorganic compound is $Sb_2O_3$.

9. A polyblend of claim 1, wherein said chloroprene rubber is crosslinked having a Mooney viscosity of about at least 200(MS-2½ min. 212°F.).

10. A polyblend of claim 1, wherein the grafted diene rubber having a weight average rubber particle size of from about 0.7 to 2.5 microns is grafted with from about 50% to 150% by weight of said monomer.

11. A polyblend of claim 1, wherein said diene rubber is selected from the group consisting of polybutadiene, butadiene-styrene copolymer and butadiene-acrylonitrile copolymer wherein said diene rubber has a cis isomer content of about 30% to 98% and a Tg range of from about −50°C. to −105°C. said butadiene copolymer rubbers having a Tg range of from about −20°C. to −70°C.

12. A polyblend of claim 1, wherein said diene rubber is polybutadiene having a cis-isomer content of about 30% to 98% and a Tg range of from about −50°C. to −105°C.

13. A polyblend of claim 1, wherein said diene rubber is a butadiene-styrene copolymer having a Tg range of from about −20°C. to −70°C.

14. A polyblend of claim 1, wherein said diene rubber is a butadiene-acrylonitrile copolymer having a Tg range of from about −20°C. to −70°C.

15. A polyblend of claim 1, wherein said cross-linked chloroprene rubber has a weight average particle size of from about 0.05 to 0.19 microns.

16. A self-extinguishing high impact strength polymeric polyblend composition comprising:
   A. about 37 to 69.5% by weight of a polymer of at least one monovinylidene aromatic monomer and an ethylenically unsaturated nitrile monomer wherein said ethylenically unsaturated nitrile monomer moiety constitutes from 0% to about 90% by weight of the said polymer uniformly blended with,
   B. a crosslinked chloroprene rubber, said rubber being present in the polyblend in from about 15–40% by weight, has a weight average particle size of from 0.05 to 0.19 microns and a Mooney viscosity of at least about 200 (MS-2 ½ min. 212°F.),
   C. a diene rubber, said diene rubber being present in the polyblend in from about 0.5–8.0% by weight, said diene rubber being grafted with:
      1. at least one monovinylidene aromatic monomer, and
      2. an ethylenically unsaturated nitrile monomer wherein said ethylenically unsaturated nitrile monomer moiety constitutes from 0% to about 90% by weight of the total monomers grafted, said diene rubber having a weight average particle size of about 0.7 to 2.5 microns, being grafted with from about 50–150% by weight of said monomers, having a cis isomer content of 30–98% and a Tg range of −50°C., to −105°C., and D. an inorganic compound, $Sb_2O_3$, being present in from about 1–15% by weight of the polyblend, the total weight percentage of the polyblend being 100%.

* * * * *